United States Patent [19]

Ono et al.

[11] Patent Number: 5,278,113
[45] Date of Patent: Jan. 11, 1994

[54] CATALYTIC BODY AND PROCESS FOR PRODUCING THE SAME

[75] Inventors: Yukiyoshi Ono, Hirakata; Kunio Kimura, Tsuzuki; Hidenobu Wakita, Yawata; Yasue Yamade, Hirakata; Hirofumi Nishida, Amagasaki, all of Japan

[73] Assignee: Matsushita Electric Industrial Co., Ltd., Osaka, Japan

[21] Appl. No.: 845,079

[22] Filed: Mar. 3, 1992

[30] Foreign Application Priority Data

Mar. 8, 1991 [JP] Japan .................................. 3-043311
May 16, 1991 [JP] Japan .................................. 3-111555
Jul. 18, 1991 [JP] Japan .................................. 3-177994

[51] Int. Cl.$^5$ .................... B01J 29/06; B01J 37/02
[52] U.S. Cl. .................................................. 502/66
[58] Field of Search ........................ 502/60, 66, 74; 423/230, 245.1

[56] References Cited

U.S. PATENT DOCUMENTS 4,323,542  4/1982  Joy, III ........................ 423/245.1

FOREIGN PATENT DOCUMENTS 0061008   9/1982   European Pat. Off.
0369576   5/1990   European Pat. Off.
0463626   1/1992   European Pat. Off.
138776   10/1979  Japan ................................ 502/60
87850    5/1985   Japan ................................ 502/74
3007845  1/1988   Japan ................................ 502/66
1-310742 12/1989  Japan ................................ 502/66
2-2261545 10/1990 Japan ................................ 502/60
9108827  6/1991   World Int. Prop. O.

OTHER PUBLICATIONS

Industrial Odor Control, by Von Bergen, J., Chemical Engineering, Aug. 1957, pp. 240-249.

*Primary Examiner*—Carl F. Dees
*Attorney, Agent, or Firm*—Stevens, Davis, Miller & Mosher

[57] ABSTRACT

A catalytic body contains a base material and, formed on the surface thereof, a catalytic coating layer containing activated alumina, zeolite, a platinum group metal and an inorganic binder.

By alternately repeating the step of adsorption of odor components with zeolite and alumina under non-heating condition and the step of heat-regeneration of the zeolite and alumina and catalytic decomposition of odor components under heating condition, offensive odors can be continuously removed over a long period and without excessively raising the temperature in the surroundings of the catalytic body.

10 Claims, 1 Drawing Sheet

CATALYTIC BODY AND PROCESS FOR PRODUCING THE SAME

BACKGROUND OF THE INVENTION

1. Field of the Invention

The present invention relates to a catalytic body used for deodorization in room heating, hot-water supply, drying, cooking, cold storage, air conditioning and incineration apparatuses and the like.

2. Related Art

Previously, deodorization of room air has been mainly effected by placing active carbon in the room to adsorb gaseous offensive odor substances. Another method which has recently come to be used is to place an apparatus having an ozone-generating function in the room and oxidatively decompose the offensive odor components with ozone gas.

These offensive odor substances are mainly sulfur-containing or nitrogen-containing organic substances, such as ammonia, fatty acids, unsaturated hydrocarbons, mercaptans, etc. They are produced by physiological phenomena, such as perspiration of living human beings, and by decomposition of foods. The above-mentioned methods of adsorption with active carbon have various problems. That is, the adsorption activity of active carbon is low for some species of the odor components, it is saturated soon and cannot easily be recovered, and it is often hindered by the moisture in the atmosphere. Consequently, active carbon is obliged to be replaced periodically. On the other hand, the method of decomposing offensive odors with ozone has problems in that a special device is necessary for controlling the concentration of generated ozone to an optimum level for the decomposition and deodorization, some odor component species are hardly decomposed by ozone, and ozone generators have a short, limited lifetime.

An object of the present invention is, overcoming the problems of the prior art mentioned above, to provide a catalytic body having a simple structure and a long life which exhibits a function of removing offensive odors and harmful gases completely.

SUMMARY OF THE INVENTION

According to the present invention, there are provided a catalytic body which comprises a base material and, formed on the surface thereof, a catalytic coating layer comprising activated alumina, a zeolite, platinum group metal and an inorganic binder; a catalytic body which comprises a base material and, formed on the surface thereof, a coating layer of double-layer structure consisting of a catalyst layer comprising activated alumina, a zeolite and a platinum group metal and a protective coating layer comprising at least one member selected from the group consisting of alumina and silica formed on the surface of the catalyst layer; and a process for producing a catalytic body which comprises the steps of coating on the surface of a base material a mixed slurry comprising activated alumina or aluminum hydroxide, a zeolite and a platinum group metal salt, the median diameter of the particles in the slurry being between 1 μm inclusive and 9 μm inclusive, and drying and firing the coating to form a catalytic coating layer.

DETAILED DESCRIPTION OF THE INVENTION

According to the present invention, the offensive odor components in the room are usually adsorbed and deodorized with the zeolite and activated alumina contained in the catalytic coating layer. Then, before the zeolite and activated alumina adsorb the odor components up to their adsorption capacity limits, the catalytic body of the present invention is heated by such heating means as heating elements or hot air, whereby the catalytic substance, platinum group metal, in the catalytic coating layer is activated, and the odor components adsorbed to the zeolite and alumina in the catalytic coating layer and the odor components present near the catalytic body are oxidatively decomposed into odorless components by the catalytic action of said activated catalytic substance existing together with the zeolite and alumina. The zeolite and alumina heated by said heating means recover their adsorption capacities again owing to the removal of adsorbed odor components, so that they can be used again for adsorbing odor components after the heating by the heating means has been stopped. Thus, by alternately repeating the step of adsorption of odor components with zeolite and alumina in the non-heating period and the step of heat-regeneration of zeolite and alumina and the catalytic decomposition of odor components in the heating period, offensive odors can be continuously removed over a long period and without excessively raising the temperature in the surroundings of the catalytic body.

The base material used in the catalytic body of the present invention may be selected from various materials, including metals, ceramics, glass, etc. The base material used may be in various forms, including plates, honeycombs, porous bodies, rods, tubes, etc.

Of these materials, preferred are alumina, mullite, silica-alumina-titania, cordierite, silica glass, lithium silicate glass and metallic bodies having a glass coating layer, because these base materials show good adhesion to the catalytic coating layer. Particularly preferred is silica glass.

Further, the base material preferably comprises a heating element and any of the above-mentioned glass body, a ceramic body and a metallic body having a glass coating layer which contains the heating element built therein or contacts with the heating element. This is because such a base material permits effective heating and rapid activation of the platinum group metal in the catalytic coating layer.

The activated alumina used in the present invention is a metastable alumina, including $\beta$-, $\gamma$-, $\delta$-, $\theta$-, $\eta$-, $\rho$- and $\chi$-alumina. The activity of the activated alumina can be further improved by making it carry a promotor, such as a rare earth element oxide, on its surface. Further, the heat stability of activated alumina can be improved by incorporating barium into the alumina.

The content of the activated alumina in the catalytic coating layer of the present invention is not critical; however, it preferably falls within the range of 20–60% by weight. When the content of activated alumina is less than 20% by weight, a satisfactory adhesion of the catalytic coating layer to a silica glass tube tends to be difficultly obtained; on the other hand, when the content exceeds 80% by weight, the odor adsorption capacity of the catalytic coating layer tends to be lowered.

Various kinds of zeolite can be used as the zeolite in the present invention. Particularly preferred among them is a copper ion exchange zeolite since it is excellent in odor adsorption capacity.

The inorganic binder used in the present invention may be at least one member selected from silica, alumina, bentonite, lithium silicate, water glass, etc. Silica is the most preferred among them. Incorporation of silica into the catalytic coating layer enables the strongest adhesion of the coating layer to a silica glass tube.

The content of silica in the catalytic coating layer is not critical; however, it preferably falls within the range of 10–40% by weight. When the content of silica exceeds 40% by weight, the catalyst coating layer tends to develop cracks and to show poor adhesion. When it is less than 10% by weight, the adhesion improving effect of silica is sometimes insufficient.

Though the silica referred to in the present invention is silicon dioxide, silicic acid may also be used in place thereof.

The catalytic coating layer of the present invention preferably contains an alumina containing an alkaline earth metal. Joint use of an alumina containing an alkaline earth metal can improve the adsorption characteristic for acidic odor substances. The content of alumina containing an alkaline earth metal is preferably between 5–30% by weight. When the content is less than 5% by weight, a sufficient effect sometimes cannot be obtained in improving the acidic odor adsorption characteristic of the catalytic coating layer. On the other hand, when the content exceeds 30% by weight, the adhesive property of the catalytic coating layer tends to become poor.

The alkaline earth metals used for the alumina containing an alkaline earth metal include magnesium, calcium, strontium and barium. The carbonates, nitrates, hydroxides or oxides of these alkaline earth metals can be reacted with alumina or aluminum hydroxide at high temperatures to obtain the alumina containing an alkaline earth metal.

One preferred embodiment of the catalytic bodies of the present invention comprises a base material and, formed on the surface thereof, a catalytic coating layer comprising activated alumina, a zeolite, a platinum group metal and an inorganic binder. The simultaneous use of the activated alumina, zeolite and platinum group metal exhibits a synergistic effect and unexpectedly improves the adsorption activity to acidic odor components as compared with the separated use of activated alumina and zeolite.

The platinum group metal preferably used in the present invention is Pt or Pd, the use to Pt and Pd in conjunction being more preferred. This is because Pt and Pd have a higher oxidative decomposition activity as compared with Rh and Ir, and the activity is further enhanced by using Pt and Pd together. The use of Ru results in vaporization of Ru and the vaporized Ru acts as a harmful substance. The platinum group metal may be incorporated into the alumina by various methods. For example, alumina is dipped in an aqueous platinum group metal salt solution and then dried and fi red. The platinum group metal is preferably incorporated into activated alumina in advance. This is because the oxidative decomposition activity of the catalyst can be improved in this way.

For obtaining a synergistic effect improving the adsorption activity to acidic odor components, the content of the platinum group metal in the catalytic coating layer preferably falls within the range of 0.1% to 8% by weight. The content less than 0.1% tends to be insufficient for obtaining the synergistic effect. The content more than 8% sometimes weakens the synergistic effect.

The catalytic coating layer of the present invention preferably has a double-layer structure consisting of a catalyst layer comprising activated alumina, a zeolite and a platinum group metal, and a protective coating layer comprising at least one member selected from the group consisting of alumina and silica formed on the surface of the catalyst layer.

By providing a coating layer comprising alumina and/or silica on the outer surface of said catalyst layer, the strength of the catalytic coating layer can be improved without deteriorating the activity of the catalyst.

The catalytic coating layer of the present invention preferably contains cerium oxide. The incorporation of cerium oxide into the catalytic coating layer can improve the oxidative decomposition activity of the catalyst on hydrocarbon compounds.

The content of cerium oxide in the catalytic coating layer is preferably between 2–15% by weight. When the content of cerium oxide exceeds 15% by weight, the oxidative decomposition characteristic of the catalyst mentioned above begins to deteriorate. When the content is less than 2% by weight, a sufficient effect of cerium oxide addition sometimes cannot be obtained.

The catalytic coating layer of the present invention preferably contains titanium oxide. The incorporation of titanium oxide into the catalytic coating layer can improve the oxidation activity of the catalyst on nitrogen compounds, such as ammonia etc.

The content of titanium oxide is the catalytic coating layer of the present invention is preferably between 3–15% by weight. When the content of titanium oxide exceeds 15% by weight, the adhesive property of the catalytic coating layer tends to be deteriorated. When the content is less than 3% by weight, a sufficient effect of titanium oxide addition sometimes cannot be obtained.

The catalytic coating layer of the present invention preferably has a specific surface area of at least 10 $m^2/g$. The ratio of the dose of for infrared radiation to the dose of radiated near infrared rays increases as the specific surface area of the catalytic coating layer increases. And a sufficiently high ratio of far infrared radiation is obtained at a specific surface area of 10 $m^2/g$ or more.

In forming the catalytic coating layer of the present invention, it is preferable to provide the catalytic coating layer after roughening the surface of a silica tube, or to provide the catalytic coating layer after thoroughly decreasing the surface or a silica tube. In this way, the adhesion between the base material and the catalytic coating layer can be strengthened.

The catalytic coating layer of the present invention can be formed by using various methods, which include, for example, spray coating, dip coating, electrostatic coating, roll coating and screen printing.

The median diameter of the particles in the mixed slurry of the process for producing the catalytic body of the present invention is preferable between 1 $\mu$m inclusive and 9 $\mu$m inclusive. When the median diameter is larger than 9 μm, the coating layer tends to become soft; on the other hand, when it is smaller than 1 μm, the coating layer tends to develop cracks.

The mixed slurry of the process preferably contains aluminum nitrate. This is because the addition of aluminum nitrate improves the adhesive property of the catalytic coating layer obtained to the base material.

The present invention will be described in more detail below with reference to Examples.

Example 1

Thoroughly mixing a mixture of 400 g of γ-alumina, 100 g of aluminum hydroxide used as the inorganic binder, 500 g of copper ion exchange type zeolite, 1500 g of water, chloroplatinic acid containing 30 g of Pt, palladium chloride containing 15 g of Pd and a suitable amount of hydrochloric acid in a ball mill gives a slurry (hereinafter slurry A). The slurry A was coated on the outside surface of a silica rube of 10 mm outside diameter, 9 mm inside diameter and 15 cm length by means of spraying. The slurry-sprayed tube was dried at 100° C. for 2 hours, and then fired at 500° C. for 1 hour to thermally decompose the aluminum hydroxide and the platinum group metal salts, thereby to form a catalytic coating layer comprising alumina and platinum group metal catalysts. Then, a catalytic body having a heating element built therein of the present invention was prepared by using the above-obtained silica tube, a nichrome wire as an electric resistor, and an insulator (hereinafter catalytic body A). The amount of the catalytic coating layer was 0.2 g. The weight of the solid in the catalytic coating layer per unit surface area of the tube was 2.122 mg/cm$^2$. The structure of the catalytic body A of the present invention as shown in FIG. 1.

Figure 1:
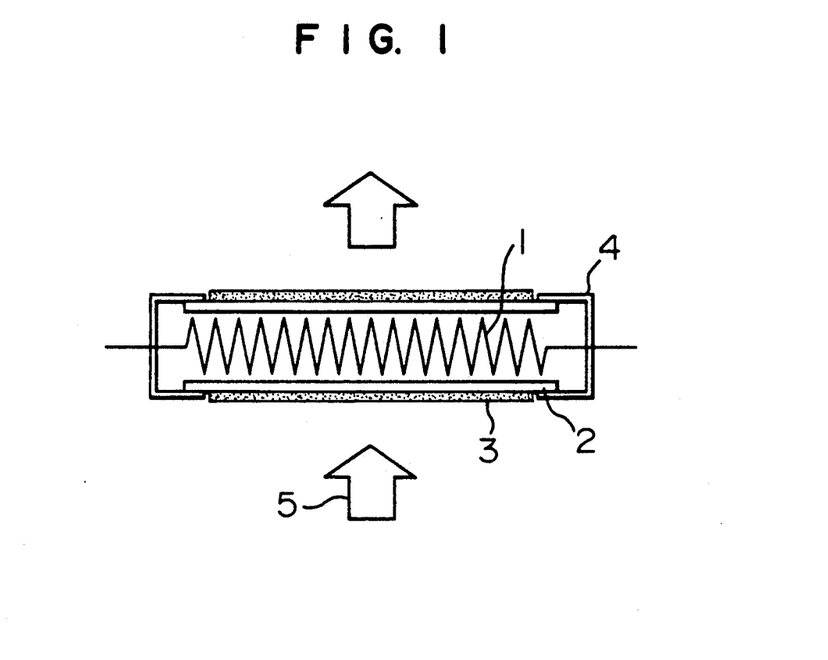
FIG. 1 is a diagram illustrating an embodiment of the present invention.

In FIG. 1, the catalytic body A [f the present invention is constructed of a nichrome wire 1 rated at 300 W at a voltage of 100 V, a silica tube 2 and a catalytic coating layer 3 formed on the surface of the tube as described above, and is insulated and held with an insulator 4.

When an electric current is not being applied to the nichrome wire 1, the odor components in the room are usually adsorbed on and deodorized with the zeolite and the activated alumina in the catalytic coating layer 3. Then, when an electric current is applied to the nichrome wire 1 before the catalytic coating layer 3 adsorbs the odor components up to the limit of its adsorption capacity, heat rays are radiated from the nichrome wire 1 in all directions. At this time, since the catalytic coating layer 3 has been provided so as to cover the outer surface of the silica tube 2, a part of the heat rays radiated from the nichrome wire 1 toward all-round directions is radiated to the catalytic coating layer, so that the radiation heating of the catalytic coating layer 3 is accomplished efficiently. The catalyst is heated up to its activation temperature in a short time, and the catalytic coating layer can be brought to an elevated temperature. The odor components adsorbed to the catalytic coating layer 3 are oxidized and deodorized by the catalyst thus activated.

Further, since the catalytic body A heats also the air present in the ambience of the body A, an air stream 5 is formed in the ambience of the catalytic body A as a convection current. When the air stream 5 contacts with the catalytic coating layer treated up to the activation temperature by the heat coming from the nichrome wire 1 or when it diffuses into the coating layer, the odor or harmful components contained in the air stream 5, e.g. carbon monoxide (hereinafter referred to as CO) and ammonia, are cleaned by catalytic action.

Therefore, even when odors, the smoke of tobacco, and harmful gases such as CO are floating in the environment in which the catalytic body A is placed, they are cleaned during the heating or use of the catalytic body A to give a comfortable environment.

Nextly, 445 g of γ-alumina into which the same amounts of platinum and palladium as in the slurry A had been incorporated beforehand by using chloroplatinic acid and palladium chloride, 100 g of aluminum hydroxide used as the inorganic binder, 500 g of copper ion exchange zeolite and 1,500 g of water were thoroughly blended in a ball mill to prepare a slurry (hereinafter slurry A'). The slurry A' was coated on the outside surface of a silica tube of 10 mm outside diameter, 9 mm inside diameter and 15 cm length by means of spraying, dried at 100° C. for 2 hours, and then fired at 500° C. for 1 hour to form a catalytic coating layer comprising alumina and platinum group metal catalysts. Then, a catalytic body A' having a heating element built therein of the present invention was prepared by using the aboveobtained silica tube, a nichrome wire as an electric resistor, and an insulator. The amount of the catalytic coating layer was 0.2 g, the same as in the catalytic body A.

The catalytic bodies A and A' were subjected to a mercaptan oxidative cleaning test and compared with a catalytic body having no catalytic coating layer. The mercaptan oxidative cleaning test was conducted as follows. The catalytic body to be tested was placed in a 0.1-m$^3$ cubic vessel made of fluorocarbon resin and heated so that the temperature of the outer surface of the center of the catalytic body became 450° C. Then, mercaptan was charged into the vessel so as to give an initial concentration of 10 ppm. The change of mercaptan concentration with the lapse of time was examined by means of gas chromatography. The results of the test are shown in Table 1.

As is apparent from Table 1, the catalytic body A' is more active than the catalytic body A. Thus, the capacity of oxidative decompostiion of odor components can be improved by incorporating platinum group metals into activated alumina beforehand.

TABLE 1

| Time elapsed (min) | Residual rate of mercaptan in using catalytic body A (%) | Residual rate of mercaptan in using catalytic body A' (%) |
| --- | --- | --- |
| 2 | 92 | 90 |
| 5 | 60 | 45 |
| 10 | 34 | 14 |
| 30 | 7 | 4 |

Example 2

Catalytic bodies each having 0.2 g of a catalytic coating layer were prepared in the same manner as in the preparation of the catalytic body A in Example 1 except that the contents of γ-alumina relative to the total solid in the catalytic coating layer were varied between 10% by weight and 85% by weight and the amount of copper ion exchange zeolite was reduced by the same amount as the increase of the activated alumina amount. The catalytic bodies thus prepared were subjected to a thermal shock test to examine the adhesive property of the coating layer. The thermal shock test was conducted as follows. An electric current was applied to the built-in electric resistor in the silica tube and the temperature of the catalytic coating layer was set at intervals of 25° C. The catalytic body was kept at the set temperature for 10 minutes, then dropped into water of room temperature and the presence of peeling of the coating layer was examined. The maximum temperature at which no peeling occurred was taken as the thermal shock resistant temperature.

Further, the odor substance adsorption capacity of each catalytic body when no electric current was being applied to the nickrome wire was tested by using methyl mercaptan, a representative odor substance The test was conducted as follows. The various catalytic bodies prepared above were placed each in a closed box of 0.1 m³ volume whose inner wall face was coated with fluorocarbon resin, and was made to adsorb methyl mercaptan in the box which had been diluted with air to a concentration of 10 ppm. The residual amount of methyl mercaptan was determined after the lapse of 30 minutes from immediately after the placing of the catalytic body and taken as the measure for the methyl mercaptan adsorption capacity. During the test, the air in the box was stirred with a fan. The results of the test are shown in Table 2.

As is apparent from Table 2, when the content of activated alumina is less than 20% by weight, the thermal shock resistant temperature is reduced; on the other hand, when it is higher than 80% by weight, the residual mercaptan concentration is reduced. Therefore, an activated alumina content not less than 20% by weight and not more than 80% by weight is preferable and gives the best adhesive property, i.e. thermal shock resistance, and odor substance adsorption capacity.

TABLE 2

| Activated alumina content (wt %) | Thermal shock resistant temperature (°C.) | Methyl mercaptan residual rate (%) |
| --- | --- | --- |
| 10 | 150 | 5 |
| 15 | 275 | 5 |
| 18 | 350 | 5 |
| 20 | 400 | 5 |
| 25 | 400 | 5 |
| 30 | 400 | 5 |
| 40 | 400 | 5 |
| 60 | 400 | 5 |
| 75 | 400 | 5 |
| 80 | 400 | 5 |
| 82 | 400 | 9 |
| 85 | 400 | 17 |

Example 3

Catalytic bodies were prepared in the same manner as in the preparation of the catalytic body A in Example 1 except that the copper ion exchange zeolite in the catalytic coating layer was replaced by other ion exchange zeolites. These catalytic bodies were tested for their odor substance adsorption capacity when no electric current was applied to the nickrome wire at room temperature by using methyl mercaptan, a representative odor substance. The test method was the same as in Example 2. The results of the test are shown in Table 3.

As is apparent from Table 3, the copper ion exchange zeolite is excellent in odor substance adsorption capacity and hence preferred.

TABLE 3

| Exchanged ion species in zeolite | Methyl mercaptan residual rate (%) |
| --- | --- |
| Cu | 5 |
| Na | 25 |
| Ca | 32 |
| Mg | 15 |
| Mn | 27 |
| Zn | 20 |
| Mordenite | 28 |

Example 4

Catalytic bodies were prepared in the same manner as in the Example 1 except that the slurry A was replaced with slurries prepared in the same manner as used for the slurry A in Example 1 except for replacing the aluminum hydroxide in the slurry by various inorganic binders so that the amounts of the inorganic binders contained in the ultimate total solid were the same. The catalytic coating layers of these catalytic bodies were subjected to a pencil hardness test according to JIS G-3320 to examine the film hardness of the layer. Further, respective catalytic bodies were subjected to a methyl mercaptan cleaning test as in Example 2. The test method was as follows. The various catalytic bodies prepared above were placed each in a closed box of 0.1 m³ volume whose inner wall face was coated with fluorocarbon resin. Then, the catalytic bodies were heated by application of an electric current to the electric resistor of the catalytic bodies and thus made to oxidatively decompose methyl mercaptan in the box which had been diluted with air to a concentration of 10 ppm. The residual rate of methyl mercaptan was determined after the lapse of 10 min from immediately after the placing of the catalytic body. The results of the test are shown in Table 4. During the test, the air in the box was stirred with a fan.

As shown in Table 4, when alumina sol or bentonite is used, the film hardness is lot. On the other hand, when lithium silicate or water glass is used, the resultant film is not porous and the catalytic activity is low, though the film hardness is improved. Thus, the use of silica as the inorganic binder is most preferable and can give a strong film without lowering catalytic activity.

TABLE 4

| Binder | Pencil hardness | Methyl mercaptan residual rate (%) |
| --- | --- | --- |
| Aqueous silica colloid solution | 4B | 54 |
| Aluminum hydroxide | 6B or less | 55 |
| Bentonite | 6B or less | 56 |
| Lithium silicate | 3H | 77 |
| Water glass | 8H | 86 |

Example 5

Slurries were prepared in the same manner as in the preparation of the slurry A in Example 1 except that colloidal silica was used in place of aluminum hydroxide as the inorganic binder to give various contents, in terms of silica, in the range of 0–50% by weight relative to the total solid in the slurry and that the amount of γ-alumina was reduced by the same amount as the increase of silica amount. Then, catalytic bodies were prepared which had 0.2 g of the catalytic coating layer of the present invention formed around the whole outer surface of a silica tube by using the slurries prepared above in the same manner as used for slurry A in Example 1. These catalytic bodies were subjected to a thermal shock test to examine the adhesive property of the coating layer. The thermal shock test was made in the same manner as in Example 2. The results of the test are shown in Table 5.

As is clear from Table 5, a silica content not less than 10% by weight and not more than 40% by weight gives the best adhesive property i.e. thermal shock resistance, and hence is preferable.

TABLE 5

| Silica content (wt %) | Thermal shock resistant temperature (°C.) |
| --- | --- |
| 0 | 400 |
| 3 | 450 |
| 4 | 475 |
| 5 | 525 |
| 6 | 575 |
| 8 | 650 |
| 9 | 675 |
| 10 | 700 |
| 35 | 700 |
| 38 | 700 |
| 39 | 700 |
| 40 | 700 |
| 41 | 650 |
| 42 | 625 |
| 45 | 550 |
| 50 | 525 |

Example 6

Catalytic bodies were prepared in the same manner as in the preparation of the catalytic body A in Example 1 but by using various tubular base materials shown in Table 6. The catalytic bodies obtained were subjected to a thermal shock test to examine the adhesive property of the coating layer. The thermal shock test was made in the same manner as in Example 2. The results of the test are shown in Table 6.

As is clear from Table 6, alumina, mullite, silica-alumina-titania, cordierite, silica glass, lithium silicate glass and a metallic body having a glass coating layer give a good adhesion between the catalytic coating layer and the base material and hence are preferable. Particularly preferred is silica glass.

TABLE 6

| Base material species | Thermal shock resistant temperature (°C.) |
| --- | --- |
| S45C | 300 |
| SUS304 | 300 |
| SUS430 | 275 |
| Glass-coated low carbon steel | 350 |
| Alumina | 350 |
| Mullite | 350 |
| Cordierite | 375 |
| Silica-alumina-titania | 375 |
| Borosilicate glass | 350 |
| Lead glass | 300 |
| Silica glass | 425 |
| Lithium silicate glass | 400 |

Example 7

In the same manner as in the preparation of the slurry A in Example 1 but by varying the milling time in the ball mill, slurries having various median particle diameters in the range of 0.8 μm–15 μm were prepared.

By using the slurries obtained above, catalytic bodies having 0.2 g of catalytic coating layer on the outer surface of a silica tube which had been degreased and washed were prepared in the same manner as in Example 1.

The film hardness of the coating layers thus formed was examined by a pencil hardness test in accordance with JIS G-3320. The results are shown in Table 7.

TABLE 7

| Slurry median particle diameter (μm) | Pencil hardness |
| --- | --- |
| 0.8 | Cracking |
| 0.9 | Cracking |
| 1.0 | 4B |
| 1.2 | 4B |
| 1.5 | 4B |
| 2.0 | 4B |
| 5.0 | 4B |
| 9.0 | 4B |
| 9.2 | 5B |
| 10.0 | 6B |
| 11.0 | 6B |
| 15.0 | 6B or less |

As is clear from Table 7, when the median diameter is larger than 9 μm, the coating layer becomes soft; when it is smaller than 1 μm, the coating layer tends to develop cracks.

Therefore, the median diameter or the particles in the mixed slurry of the present invention is preferably not less than 1 μm and not more than 9 μm.

Example 8

The outside surface of a silica tube of 10 mm outside diameter, 9 mm inside diameter and 344 mm length was degreased and washed.

Thoroughly mixing 445 g of γ-alumina containing the same content of platinum and palladium as in slurry A prepared using chloroplatinic acid and palladium chloride in the same manner as used for preparing slurry A' in Example 1, 100 g of aluminum hydroxide used as an inorganic binder, 400 g of a copper ion exchange zeolite, 100 g of alumina containing 5% of barium and 1,500 g of water with a ball mill gave a slurry (hereinafter slurry C).

The slurry C had a mean particle diameter of 4.5 μm. The slurry C was sprayed onto the entire outside surface of the above-mentioned silica tube with the exception of bands of area at the two ends having a width of 33 mm, respectively. Thereafter, the sprayed tube was dried at 100° C. for 2 hours and then fired at 500° C. for 1 hour to allow silicic acid to react. Thus, a silica tube having a catalyst coating layer was prepared. The coating weight was 1.0 g. The weight of the solid in the catalytic coating layer per unit surface area of the tube was 1.145 mg/cm$^2$.

The alumina containing barium was prepared by reacting prescribed amounts of barium carbonate and aluminum hydroxide at 1,000° C.

Then a catalytic body having a catalytic coating layer was prepared by making the silica tube have a coiled nichrome wire 1 of 40 Ω built-in, and insulating and holding the both sides of the silica tube with an insulator 4 (hereinafter catalytic body C).

Separately, the slurry A' prepared in Example 1 was coated by means of spraying on the entire outside surface of the silica tube mentioned above with the exception of bands of area at the two ends having width of 33 mm, respectively, then dried at 100° C. for 2 hours, and fired at 500° C. for 1 hour to effect the reaction of silicic acid, whereby a silica tube having a catalytic coating layer was prepared. The coating weight was 1.0 g. Then, a catalytic body having a catalytic coating layer was prepared by making the silica tube have a coiled nichrome wire 1 of 40 Ω built-in, and insulating and holding the both sides of the silica tube with an insulator 4 (hereinafter catalytic body A'2).

The catalytic body C and the catalytic body A2 were subjected to an acetic acid adsorption test and compared with a catalytic body having no catalytic coating layer. The acetic acid adsorption test was conducted as follows. The catalytic body was placed in a 0.25-m³ cubic vessel made of fluorocarbon resin. The catalytic body was not heated. Acetic acid was charged into the vessel so as to give a concentration of 40 ppm, and the change of the concentration with the lapse of time was determined by means of gas chromatography. The results of the test are shown in Table 8.

As is clear from Table 8, the catalytic bodies A2 and C, which had a catalytic coating layer, can effect deodorization through acetic acid adsorption at room temperature. The catalytic body C has a higher acetic acid adsorption activity than the catalytic body A2. Therefore, it is preferable that the catalytic coating layer contains an alumina that contains an alkaline earth metal. By jointly using an alumina containing an alkaline earth metal, the adsorption property for acidic odor substances can be improved.

TABLE 8

| Time elapsed (min) | Acetic acid residual rate in using catalytic body A2 (%) | Acetic acid residual rate in using catalytic body C (%) | Acetic acid residual rate in using catalytic body having no catalytic coating layer (%) |
|---|---|---|---|
| 10 | 76 | 63 | 98 |
| 20 | 60 | 52 | 95 |
| 40 | 55 | 43 | 94 |
| 60 | 52 | 39 | 94 |
| 80 | 51 | 35 | 93 |
| 100 | 49 | 32 | 93 |

Example 9

A slurry was prepared by repeating the same procedure for preparing slurry A in Example 1 except that no platinum salt was used (hereinafter comparative slurry 1). A slurry was prepared by repeating the same procedure for preparing slurry A in Example 1 except that no platinum salt was used and the γ-alumina was replaced by the copper ion exchange zeolite (hereinafter comparative slurry 2). A slurry was prepared by repeating the same procedure for preparing slurry A in Example 1 except that no platinum salt was used and the copper ion exchange zeolite was replaced by the γ-alumina (hereinafter comparative slurry 3). Three catalytic bodies having 1.0 g of the similar catalyst coating layer as the catalytic body C were prepared by using each of the comparative slurries 1, 2 and 3 (hereinafter comparative catalytic bodies 1, 2 and 3, respectively).

The comparative catalytic bodies 1, 2 and 3 were subjected to the same acetic acid adsorption test as in Example 8. The acetic acid residual rate after 60 minutes of the comparative catalytic bodies was compared with that of the catalytic body A2 of the present invention.

Table 9 shows the results. As is clear from Table 9, the catalytic body A2 of the present invention exhibits unexpectedly higher acetic acid adsorption activity than any of the comparative catalytic bodies 1, 2 and 3. Here, acetic acid is a representative choice of the acid odor substances. Therefore, the simultaneous use of active alumina, a zeolite and a platinum group metal synergistically improves the adsorption activity to acidic odor substances. The improvement is far greater than expected from the separated use of active alumina and zeolite.

TABLE 9

| | Acetic acid residual rate after 60 minutes (%) |
|---|---|
| Catalytic body A2 | 52 |
| Comparative catalytic body 1 | 60 |
| Comparative catalytic body 2 | 78 |
| Comparative catalytic body 3 | 85 |

Further, slurries were prepared by repeating the same procedure for preparing slurry A in Example 1 except that chloroplatinic acid was used is the platinum group metal salt in such an amount that the content of Pt in the slurry varies over the range of 0–10% by weight relative to the solid in the slurry. Catalytic bodies having 1.0 g of the similar catalyst coating layer as the catalytic body C in Example 8 were prepared by using each of the thus prepared slurries.

The thus prepared catalytic bodies were subjected to the same acetic acid adsorption test as in Example 8. The acetic acid residual rate after 60 minutes of the catalytic bodies was compared with each other.

Table 10 shows the results. As is clear from Table 10, the content platinum group metal less than 0.1% by weight does not give sufficient synergistic effect mentioned above; on the other hand, the content of platinum group metal more than 8% by weight reduces the synergistic effect.

Therefore, the content of Pt in the catalytic coating layer is preferably between 0.1% to 8% by weight in order to obtain synergistic effect which largely improves the absorption activity to acidic odor substances.

TABLE 10

| Content of Pt (% by weight) | Acetic acid residual rate after 60 minutes (%) |
|---|---|
| 0 | 60 |
| 0.08 | 55 |
| 0.09 | 54 |
| 0.1 | 53 |
| 0.2 | 53 |
| 0.5 | 53 |
| 1.0 | 53 |
| 2.0 | 53 |
| 5.0 | 53 |
| 7.0 | 53 |
| 8.0 | 53 |
| 9.0 | 55 |

TABLE 10-continued

| Content of Pt (% by weight) | Acetic acid residual rate after 60 minutes (%) |
|---|---|
| 10.0 | 58 |

Example 10

The outside surface of a silica tube of 10 mm outside diameter, 9 mm inside diameter and 344 mm length was degreased and washed.

On the other hand, a slurry was prepared by thoroughly mixing in a ball mill 140 g of a γ-alumina containing Pt, 400 g of an aqueous silica colloid solution containing 20% by weight in terms of silica, 200 g of water, 140 g of copper ion exchange zeolite A, 38 g of γ-alumina and 3 g of barium carbonate (hereinafter slurry D). The slurry D had a mean particle diameter of 4.5 μm. The slurry D was coated by means of spraying on the entire outside surface of the silica tube treated above with the exception of bands of area at the two ends having a width of 33 mm, respectively, then dried at 100° C. for 2 hours, and fired at 500° C. for 1 hour to effect the reaction of silicic acid, whereby a silica tube having a catalytic coating layer was prepared. The coating weight was 1.0 g and the Pt content was 25 mg.

Then, a catalytic body having a catalytic coating layer was prepared by making the silica tube have a coiled nichrome wire 1 of 40 Ω built-in, and insulating and holding the both sides of the silica tube with an insulator 4 (hereinafter catalytic body D).

The catalytic body D was subjected to the same acetic acid adsorption test as in Example 8 and compared with the catalytic body C. The results are shown in Table 11.

As is clear from Table 11, the catalytic body C, in which a barium-containing alumina was used, has a higher acetic acid adsorption activity than the catalytic body D, which contained the same amount of barium as its carbonate.

TABLE 11

| Time elapsed (min) | Acetic acid residual rate in using catalytic body C (%) | Acetic acid residual rate in using catalytic body D (%) |
|---|---|---|
| 10 | 63 | 92 |
| 20 | 52 | 89 |
| 40 | 43 | 87 |
| 60 | 39 | 80 |
| 80 | 35 | 77 |
| 100 | 32 | 68 |

Example 11

Slurries were prepared in the same manner as in the preparation of the slurry C in Example 8 except for varying the kind of the alkaline earth me-al contained in the alumina in the slurry as shown in Table 12. Then, catalytic bodies were prepared in the same manner as in Example 8 but by using the slurries obtained above.

These catalytic bodies were tested for their odor substance adsorption capacity at room temperature by using acetic acid. The test method was the same as in Example 8. The results of the test are shown in Table 12.

As is apparent from Table 12, the catalyst body selecting barium as the alkaline earth metal to be contained in alumina gives the shortest time required for the acetic acid residual rate to reach 50% among the tested catalytic bodies selecting alkaline earth metals. Thus, barium is the most effective for improving the odor substance adsorption capacity and hence preferable.

TABLE 12

| Alkaline earth metal | 50% Acetic acid adsorption time (min) |
|---|---|
| Mg | 31 |
| Ca | 30 |
| Sr | 24 |
| Ba | 21 |

Example 12

Slurries were prepared in the same manner as in the preparation of the slurry C in Example 8 except that the content of the alumina containing an alkaline earth metal was varied over the range of 0–40% by weight and the amount of zeolite was decreased by the same amount as the increase of alumina amount. Then, catalytic bodies having 1.0 g of a catalytic coating layer formed on the entire outside surface of a silica tube were prepared by using the slurries obtained above in the same manner as in Example 8.

These catalytic bodies were tested for their odor substance adsorption capacity at room temperature by using acetic acid. The test method was the same as in Example 8. At the same time, the catalytic bodies were subjected to a thermal shock test in the same manner as in Example 2. The results of these tests are shown in Table 13.

As is apparent from Table 13, when the content of alumina is less than 5% by weight, a sufficient improving effect on the acetic acid adsorption by the incorporation of alumina cannot be obtained; when the content of alumina is higher than 30% by weight, the adhesive property of the catalytic coating layer becomes poor.

Therefore, a preferable content of alumina containing an alkaline earth metal is not less than 5% by weight and not more than 30% by weight.

TABLE 13

| Alumina content (wt. %) | 50% Acetic acid adsorption time (min) | Thermal shock resistant temperature (°C.) |
|---|---|---|
| 0 | 37 | 700 |
| 2 | 34 | 700 |
| 4 | 26 | 700 |
| 5 | 21 | 700 |
| 6 | 21 | 700 |
| 10 | 21 | 700 |
| 20 | 21 | 700 |
| 29 | 21 | 700 |
| 30 | 21 | 700 |
| 31 | 21 | 675 |
| 33 | 21 | 650 |
| 40 | 21 | 600 |

Example 13

Catalytic bodies were prepared in the same manner as in the preparation of the catalytic body A in Example 1 except that the platinum group metal was changed to Pd, Ru, Rh or Ir, or to a mixture of Pt and Pd in a ratio of 2:1 (catalytic body A). These catalytic bodies were examined for their oxidative decomposition power for acetaldehyde. The weight of the catalyst coating layer is 0.2 g in all the bodies. The total amounts of the platinum group metals were the same in the catalytic coating layer. The acetaldehyde oxidative cleaning test was conducted as follows. The catalytic body to be tested was placed in a 0.1-m³ cubic vessel made of fluorocarbon resin and heated so that the temperature of the outer surface of the center of the catalytic body became 450° C. Then, acetaldehyde was charged into the vessel to give an initial concentration of 100 ppm and the change of the concentration with the lapse of time was examined. The residual rates of aldehyde 10 minutes after the start of the test are shown in Table 14.

As shown in Table 14, the catalytic bodies using Pt, Pd and Ru gave higher activities than those using Rh and Ir, and the joint use of Pt and Pd gave a further enhanced activity. Further, the respective catalysts were heat-treated at 850° C. for 50 hours and then examined for their activity. Resultantly, it was found that the catalyst containing Ru alone showed a markedly deteriorated activity, whereas the other catalysts showed no appreciable change in activity. This is considered to be attributed to the vaporization of Ru at high temperatures. From these results, it is preferable to use Pt and/or Pd, which are thermally stable.

TABLE 14

| Platinum group metal species | Acetaldehyde residual rate after 10 min (%) |
| --- | --- |
| Pt | 10 |
| Pd | 10 |
| Rh | 18 |
| Ru | 9 |
| Ir | 21 |
| Pt—Pd | 7 |

Example 14

Figure 2:
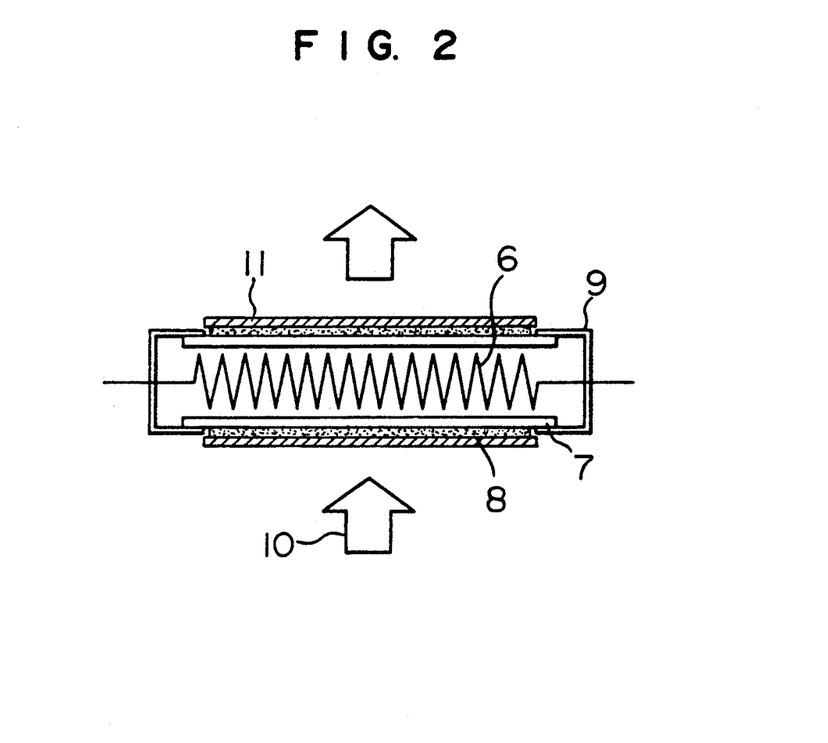
FIG. 2 is a diagram illustrating a second embodiment of the present invention.

FIG. 2 shows an embodiment of the claimed catalytic body which comprises a base material and, formed on the surface thereof, a coating layer of doublelayer structure consisting of a catalyst layer comprising activated alumina, a zeolite and a plating group metal and a protective coating layer comprising at least one member selected from the group consisting of alumina and silica formed on the surface of the catalyst layer. In FIG. 2, 6 is nichrome wire, 7 silica tube. 8 catalytic coating layer, 9 insulator, 10 air stream and 11 protective coating layer, respectively.

The outside surface of a silica tube of 10 mm outside diameter, 9 mm inside diameter and 344 mm length was degreased and washed.

On the other hand, a slurry was prepared by thoroughly mixing in a ball mill 600 g of aluminum hydroxide having a specific surface area of 210 m²/g, 800 g of an aqueous silica colloid solution containing 20% by weight in terms of silica, 320 g of copper ion exchange zeolite A, 700 g of water and chloroplatinic acid containing 36 g of Pt. The slurry had a mean particle diameter of 3 μm. The slurry was coated by means of spraying on the entire outside surface of the same silica tube as in Example 8 with the exception of bands of area at the two ends having a width of 33 mm, respectively, then dried at 100° C. for 2 hours, and fired at 500° C. for 1 hour to effect the reaction of silicic acid and aluminum hydroxide. Thus, a silica tube having a catalytic coating layer comprising copper ion exchange zeolite and silica-alumina was prepared. The weight of the coating layer was 0.60 g and the Pt content was 15.5 mg. The weight of the solid in the catalyst coating layer per unit surface of the tube was 0.687 mg/cm². The film strength of the layer, as determined by the pencil hardness test method, was 4B.

The both ends, each has a width of 33 mm, of the silica tube were covered. Then, the silica tube was impregnated with a 10% by weight alumina sol, dried at room temperature and then fired at 500° C. for 1 hour, to carry 0.12 g of an overcoating layer of alumina. The film strength of the layer, as determined by the pencil hardness test method, was B. Further, a similar silica protective coating layer and silica-alumina protective coating layer were formed by using silica sol and a mixture of silica sol and alumina sol, respectively, in place of alumina sol. The resulting catalytic coating layers gave a good pencil hardness, namely HB and B, respectively.

Example 15

In the same manner as in the preparation of the catalytic body A in Example 1 except that the platinum group metal was not added in the preparation of the slurry A, an alumina-zeolite coating layer was formed on a silica tube. Then, the coating layer was impregnated with an aqueous platinum group metal salt solution by means of dipping and then heat-treated. Thus, a catalytic body carrying a platinum group catalyst in the same amount as in the catalytic body A was prepared (hereinafter catalytic body B).

These catalytic bodies were subjected to an ammonia cleaning test, ammonia being selected as the odor substance.

The test method was as follows. The catalytic body was placed in a closed box of 0.1 m³ volume whose inner wall face was coated with fluorocarbon resin, similar to the used in Example 2. Ammonia in the box air-diluted to a concentration of 10 ppm was oxidatively decomposed by applying electricity at a voltage of 100 V to the electric resistor of the catalytic body. The time of electricity application required until 80% of the ammonia in the box was oxidatively decomposed was determined.

The results were found to be 31 minutes with the catalytic body A and 38 minutes with the catalytic body B.

Thus, the catalytic body A, which is prepared by using the slurry A containing a plating group metal salt in the slurry, is capable of oxidatively decomposing an odor substance in a shorter time and hence gives a better catalytic activity than catalytic bodies obtained by the method of preparing the catalytic body B.

Example 16

Slurries were prepared in the same manner as in the preparation of the slurry A in Example 1 except that the ratio of γ-alumina to aluminum hydroxide was changed variously while the sum of their amounts was kept constant as in Example 1. Then, catalytic bodies were prepared by using these slurries in the same manner as in the Example. The catalytic bodies thus obtained were subjected to the thermal shock test shown in Example 2 and the ammonia cleaning test shown in Example 14. The results of these tests are shown in Table 15.

As is apparent from Table 13, catalytic activity can be improved by replacing aluminum hydroxide in the slurry A of Example 1 by activated alumina. However, when more than 94% by weight of aluminum hydroxide is replaced by activated alumina, the thermal shock resistance is reduced; on the other and, when the replaced proportion is less than 23% by weight, a sufficient effect of replacement by activated alumina is not obtained. Therefore, a preferred proportion of aluminum hydroxide to be replaced by activated alumina is from 23% by weight to 94% by weight.

TABLE 15

| γ-Alumina amount (wt. %) | Thermal shock resistant temperature (°C.) | 80% Ammonia cleaning time (min) |
| --- | --- | --- |
| 0 | 400 | 31 |
| 19 | 400 | 31 |
| 20 | 400 | 30 |
| 21 | 400 | 28 |
| 22 | 400 | 24 |
| 23 | 400 | 22 |
| 60 | 400 | 22 |
| 90 | 400 | 22 |
| 93 | 400 | 22 |
| 94 | 400 | 22 |
| 95 | 375 | 22 |
| 96 | 350 | 22 |

Example 17

In the same manner as in Example 1 except that various amounts of cerium nitrate hexahydrate were added to the slurry A of Example 1, catalytic bodies were prepared which had on the silica tube outside surface a catalytic coating layer that was of the same amount as in the catalytic body A and contained cerium oxide formed by thermal decomposition of cerium nitrate in varied amounts as shown in Table 16. In the preparation, the amount of alumina in the catalytic coating layer was reduced by the same amount as the increase of cerium oxide amount.

The catalytic bodies prepared above were subjected to an acetic acid cleaning test, acetic acid being used as the odor substance.

The rest method was as follows. The catalytic body was placed in a closed box of 0.1 m³ volume whose inner wall face was coated with fluorocarbon resin, similar to that used in Example 2. Acetic acid in the box air-diluted to a concentration of 50 ppm was oxidatively decomposed by applying electricity at a voltage of 100 V to the catalytic body. The time of electricity application required until 80% of the acetic acid in the box was oxidatively decomposed was determined.

The results of the test are shown in Table 16.

As shown in Table 16, by incorporation of cerium oxide into the catalytic coating layer, the catalytic oxidation activity on hydrocarbon compounds can be improved.

When the content of cerium oxide exceeds 15% by weight, the oxidative decomposition activity of the catalyst begins to be poor. When the content is less than 2% by weight, a sufficient effect of cerium oxide addition cannot be obtained. Therefore, the content of cerium oxides the catalytic coating layer is preferably 2-15% by weight.

TABLE 16

| Cerium oxide content (wt. %) | 80% Acetic acid cleaning time (min) |
| --- | --- |
| 0 | 43 |
| 1 | 41 |
| 2 | 35 |
| 3 | 34 |

TABLE 16-continued

| Cerium oxide content (wt. %) | 80% Acetic acid cleaning time (min) |
| --- | --- |
| 4 | 34 |
| 7 | 34 |
| 10 | 34 |
| 14 | 34 |
| 15 | 34 |
| 16 | 37 |
| 17 | 39 |

Example 18

In the same manner as in Example 1 except for adding various amounts of titanium oxide to the slurry A of Example 1, catalytic bodies were prepared which had on the silica tube outside surface a catalytic coating layer that was of the same amount as in the catalytic body A and contained varied amounts of titanium oxide as shown in Table 17. In the preparation, the amount of alumina in the catalytic coating layer was reduced by the same amount as the increase of titanium oxide amount.

These catalytic bodies were subjected to an ammonia cleaning test in the same manner as in Example 14, ammonia being selected as the odor substance. Further, they were subjected to an adhesive property test in the same manner as in Example 2.

The results of these tests are shown in Table 17.

As shown in Table 17, the catalytic oxidation activity on ammonia can be improved by incorporation of titanium oxide into the catalytic coating layer.

When the content of titanium oxide exceeds 15% by weight, the adhesive property of the catalytic coating layer becomes poor. On the other hand, when the content is less than 3% by weight, a sufficient effect of titanium oxide addition is not obtained. Therefore, the content of titanium oxide in the catalytic coating layer is preferably 3-15% by weight.

TABLE 17

| Titanium oxide content (wt. %) | Thermal shock resistant temperature (°C.) | 80% Ammonia cleaning time (min) |
| --- | --- | --- |
| 0 | 400 | 31 |
| 1 | 400 | 27 |
| 2 | 400 | 23 |
| 3 | 400 | 20 |
| 4 | 400 | 20 |
| 8 | 400 | 20 |
| 10 | 400 | 20 |
| 12 | 400 | 20 |
| 13 | 400 | 20 |
| 14 | 400 | 20 |
| 15 | 400 | 20 |
| 16 | 375 | 20 |
| 17 | 350 | 20 |

Example 19

Catalytic coating layers were formed by using the slurry A of Example 1, on base materials made of cordierite and in the form of plate, honeycomb, porous body, rod, or tube as shown in Table 18. Then, the catalytic coating layers thus formed on these base materials were subjected to the adhesive property test mentioned above. The results are shown in Table 18.

As is apparent from Table 18, a preferable form of base material is honeycomb, porous body and tube.

Particularly preferred of them is the tubular form, which gives the best thermal shock resistance.

TABLE 18

| Form of base material | thermal shock resistant temperature (°C.) |
|---|---|
| Tube | 350 |
| Honeycomb | 300 |
| Rod | 275 |
| Plate | 250 |
| Porous body | 300 |

As set forth above, according to the present invention, the odor substances and harmful gases, such as tobacco smoke, in the atmosphere in which the catalytic body of the present invention is placed are removed and cleaned by the adsorptive action and catalytic action of the catalytic coating layer. Accordingly, a comfortable atmosphere containing little odor substances can be provided by installing the catalytic body.

What is claimed is:

1. A catalytic body which comprises a base material and, formed on the surface thereof, a catalytic coating layer comprising activated alumina, a zeolite, a platinum group metal, an inorganic binder and an alumina containing an alkaline earth metal.

2. The catalytic body according to claim 1, wherein the content of activated alumina in the catalytic coating layer is 20-80% by weight.

3. The catalytic body according to claim 1, wherein the zeolite is a copper-containing zeolite.

4. The catalytic body according to claim 1, wherein the inorganic binder is silica.

5. The catalytic body according to claim 4, wherein the content of silica in the catalytic coating layer is 10-40% by weight.

6. The catalytic body according to claim 1, wherein the activated alumina comprises a platinum group metal.

7. The catalytic body according to claim 1, wherein the alkaline earth metal is barium.

8. The catalytic body according to claim 1, wherein the content of alumina containing an alkaline earth metal in the catalytic coating layer is 5-30% by weight.

9. A catalytic body which comprises a base material and, formed on the surface thereof, a coating layer of double-layer structure consisting of a catalyst layer comprising activated alumina, a zeolite, a platinum group metal and an alumina containing an alkaline earth metal and a protective coating layer comprising at least one member selected from the group consisting of alumina and silica formed on the surface of the catalyst layer.

10. A process for producing a catalytic body which comprises the steps of coating on the surface of a base material a mixed slurry comprising activated alumina or aluminum hydroxide, a zeolite, a platinum group metal salt and an alumina containing an alkaline earth metal, the median diameter of the particles in the slurry being between 1 $\mu$m inclusive and 9 $\mu$m inclusive, and drying and firing the coating to form a catalytic coating layer.

* * * * *